(12) United States Patent
Birkwald et al.

(10) Patent No.: US 6,296,418 B1
(45) Date of Patent: Oct. 2, 2001

(54) DEVICE FOR FASTENING A WORKING PART TO A BEAM OF AN AUTO BODY

(75) Inventors: Oliver Birkwald, Sindelfingen; Stephan Boucky, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/347,858

(22) Filed: Jul. 9, 1999

(30) Foreign Application Priority Data

Jul. 9, 1998 (DE) ............................................. 198 30 762

(51) Int. Cl.[7] ........................................................ F16B 5/02
(52) U.S. Cl. ........................ 403/408.1; 403/11; 403/270; 280/800
(58) Field of Search ................................. 403/408.1, 24, 403/25, 270, 271, 11, 12, 21; 280/800, 124.134, 781

(56) References Cited

U.S. PATENT DOCUMENTS

| | | | |
|---|---|---|---|
| 4,921,265 | * | 5/1990 | Eyb et al. .................. 280/124.134 X |
| 5,183,286 | * | 2/1993 | Ayabe ........................ 280/124.134 X |
| 5,558,369 | * | 9/1996 | Cornea et al. ........................ 280/800 |
| 5,862,877 | * | 1/1999 | Horton et al. .................... 280/781 X |
| 5,906,034 | * | 5/1999 | Weisshaar .............................. 29/257 |
| 6,062,602 | * | 5/2000 | Biesinger et al. .................... 280/781 |

FOREIGN PATENT DOCUMENTS

| | | |
|---|---|---|
| 43 14 441 | 6/1994 | (DE) . |
| 43 43 642 | 6/1995 | (DE) . |
| 195 33 138 | 11/1996 | (DE) . |
| 2 694 226 | 2/1994 | (FR) . |

* cited by examiner

Primary Examiner—Harry C. Kim
(74) Attorney, Agent, or Firm—Crowell & Moring, L.L.P.

(57) ABSTRACT

In the mounting of working parts, especially the vehicle's axles, it is difficult to weld on the female threaded parts. To overcome this problem, the female threaded part is configured as an internally threaded stud. This stud is passed through a bore disposed in the lower flange of the beam. A flange fixedly attached to the stud is spot-welding to a cage whose walls are spot-welded to the upper and lower flanges of the beam. The welding procedure is thereby greatly simplified.

12 Claims, 3 Drawing Sheets

DEVICE FOR FASTENING A WORKING PART TO A BEAM OF AN AUTO BODY

BACKGROUND AND SUMMARY OF THE INVENTION

This application claims the priority of German patent 198 30 762.4, filed Jul. 9, 1998, the disclosure of which is expressly incorporated by reference herein.

The invention relates to a device for fastening a working part, especially an axle, to a beam in the body of a motor vehicle, consisting of a stud with internal screw thread disposed on a beam by means of a flange, and of a screw on the working part, which cooperates with this stud.

It is known to mount the control arm for the arrangement of the links for the wheels of a motor vehicle and for the arrangement of the shaft driving the wheels and differential on each longitudinal beam of the body by means of a fastening point that is "loose" for equalization of tolerances and with a rigid fastening point. For the rigid fastening the former practice has been to weld internally threaded studs to the bottom of the lower flange of the channel-shaped beam with a flange. The MIG or MAG welding processes used for this welding are complicated.

A device for forming a "loose" fastening is disclosed in German patent document DE 195 33 138 C1. In that case a hood-like sheet metal cage is disposed on a flat metal part of the body, which in turn is provided with a disk-like holder for the threaded socket which is provided either with a threaded stud which is guided with radial clearance in the hood-like sheet metal cage, or which has an annular groove to receive an annular margin of the threaded socket which in turn is disposed for radial displacement in the mounting. With this measure the threaded socket remains radially displaceable in all directions in front of the opening provided in the body through which the screw is then passed to install the working part. Equalization of tolerances is possible in all directions.

French patent document FR 2 694 226 A1 discloses the fixation of nuts for mounting bolts serving for mounting an axle in a certain position by means of a jig, and then welding it. Such threaded sockets must, as in the case of the types of construction mentioned above, be welded with difficulty in order to achieve the necessary stability.

Through German patent document DE 43 14 441 C1 it is known to apply reinforcing parts with a threaded bore for fastening a motor vehicle assembly to a hollow beam with at least two flanges on two sides of the hollow beam and to provide for spot welding. The threaded bore itself is configured as a material passage and positioned with the free end at a bore in the hollow beam. By this configuration the forces that act are said to be distributed uniformly and over a broad surface. A threaded insert which is displaceable to a certain extent for alignment purposes is not, however, contemplated.

It is the object of the present invention to provide a simpler construction of the rigid fastening point of a working part of the kind generally described above.

This and other objects have been achieved according to the present invention by providing a threaded socket which is introduced with clearance into an opening in the bottom flange of the beam and having a flange which is placed against the beam surface surrounding the opening, and which is affixed to a cage serving as a support which is provided with surfaces in contact with the flange and with the upper and lower flanges of the beam. This design, which can be achieved in an especially simple manner on a beam of channel-like construction, which is provided in one of its flanges with an opening to accommodate the bolt, has the advantage that complex welding of the flange to the beam is unnecessary and instead a simple spot welding of the cage to the upper and lower beam flange and a spot welding of the flange to the cage is sufficient to achieve an extraordinarily stable arrangement. The cage serving for the fixation of the threaded stud is carried with sufficient stability in the beam and secures and in turn holds the flange with the threaded stud on the beam. Accordingly a simple possibility for adjustment is created prior to the spot welding.

In a further embodiment of the invention the stud flange can in turn be spot welded to the bottom flange and provided with at least two upstanding guiding walls aligned parallel to one another for contact with contact surfaces of the cage, which is thus easily mounted and held on the beam. In a further embodiment of the invention, the cage may comprise of two lateral walls running parallel to one another at least in the range of the guiding walls of the flange, which are matched to the height of the beam and are provided at their extremities with flanges running parallel to the beam flanges for fastening to the beam.

These lateral walls can be connected together by at least two cross walls for purposes of stability, the front cross wall of the cage at the open side of the beam being so dimensioned that the guiding walls of the flange fit beneath it to make the installation possible.

Lastly, in a further embodiment of the invention, it can be arranged for the upwardly reaching guiding walls of the flange to be the prolongation of opposite lateral walls of a lateral wall frame around the flange. With this configuration an especially stable construction and good mounting can be achieved in the cage.

Other objects, advantages and novel features of the present invention will become apparent from the following detailed description of the invention when considered in conjunction with the accompanying drawings.

DETAILED DESCRIPTION OF THE DRAWINGS

Figure 1:
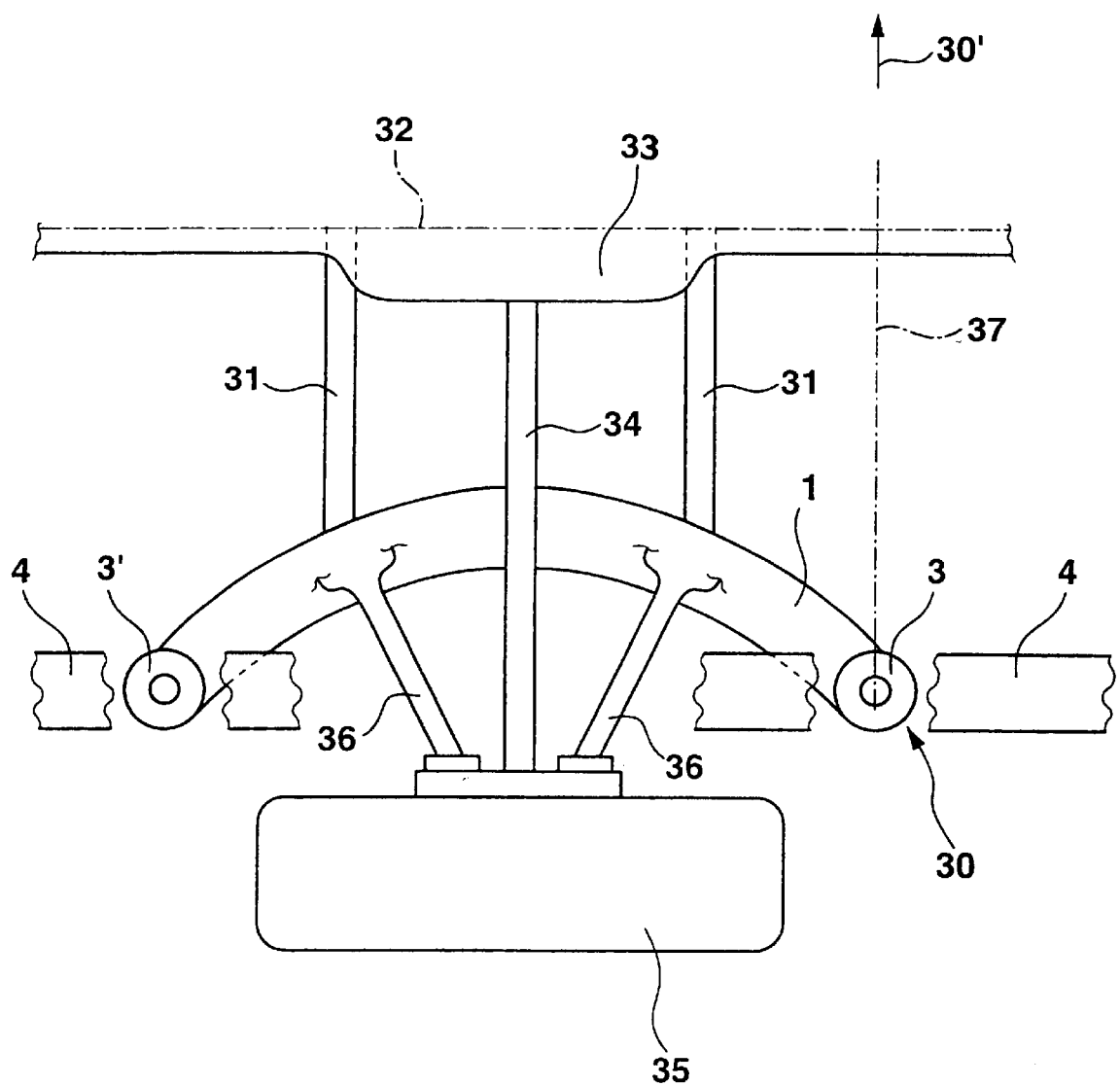
FIG. 1 is a schematic top view of an arrangement for fastening a control arm to the longitudinal beams of a motor vehicle.

FIG. 1 shows the half of a control arm 1 which is fastened in the rear area of a vehicle body, not shown, and below on a beam 4 of the body by means of two eyes 3 and 3', of which eye 3' is connected in a manner not shown, since it is known, through a likewise not shown floating threaded socket in the manner of a loose bearing to the beam 4, but the eye 3 is joined fixedly to the fastening point 30 with the longitudinal beam 4.

The illustrated portion of the control arm 1 is connected by cross members 31 to a second control arm part configured in a mirror-image relationship to the central longitudinal plane 32 of the vehicle and receives the differential 33 as well as the drive shaft 34 leading to the wheel 35 and links 36 for the guidance of the wheel 35. In the mounting of the control arm it is important regarding the fixed fastening point 30 that the fastening point 30' that is situated in a mirror-image relationship to the plane 32 is arranged in an exact mirror-image relationship in order to avoid any misalignment of the wheels lengthwise of the vehicle. In practice, therefore, a jig is used, as a rule, for the purpose of achieving an alignment of the fastening points 30 and 30' in the plane 37 indicated by the broken line.

The rigid mounting is therefore to be configured such that, on the one hand, it results in an extremely stable and solid arrangement of the control arm 1, but on the other hand a certain adjustment must be available before it is fastened, so as to assure alignment in the plane 37.

Figure 2:
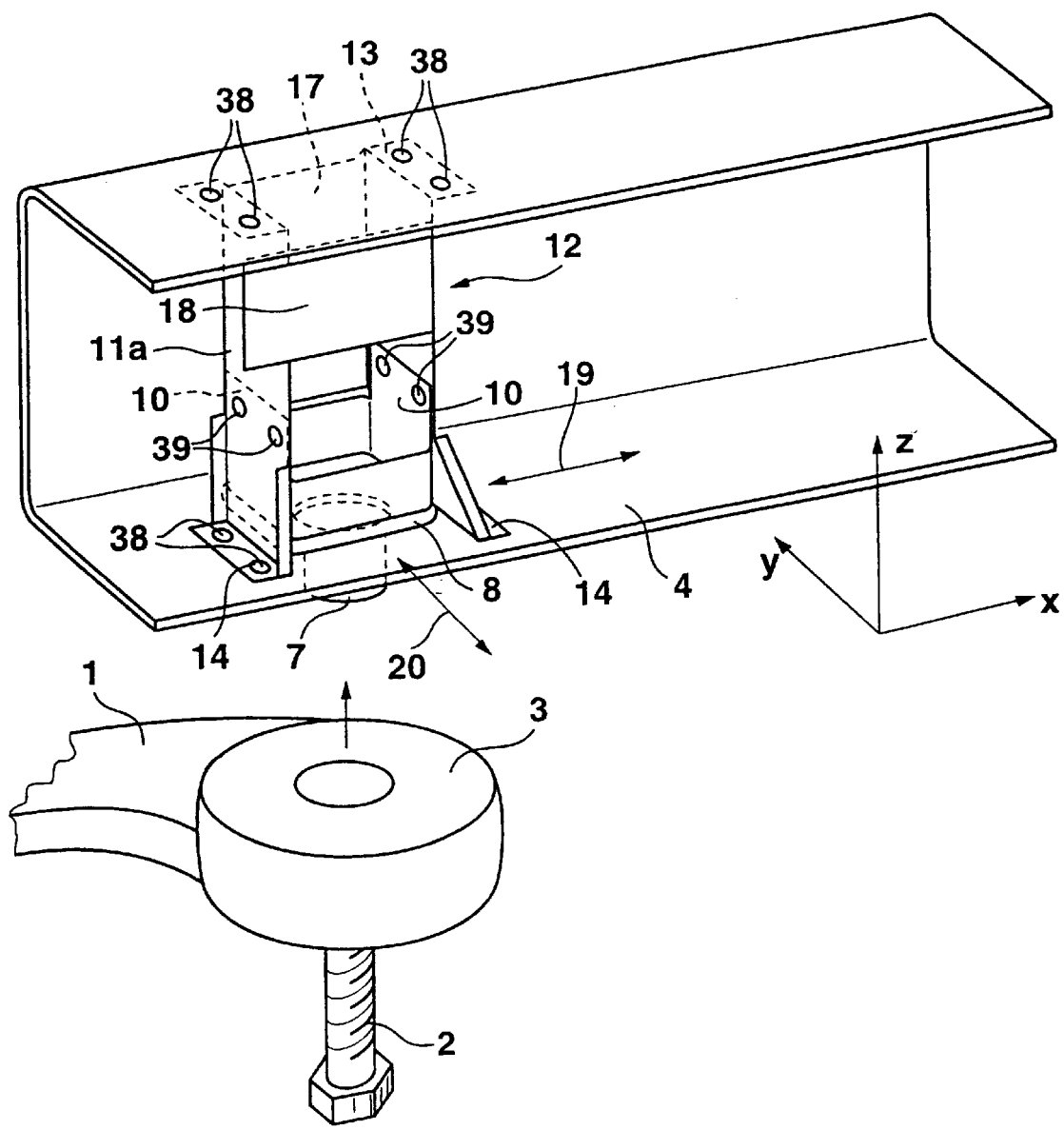
FIG. 2 is a schematic perspective view of a fastening system according to a preferred embodiment of the present invention for the rigid fastening of a control arm.
Figure 3:
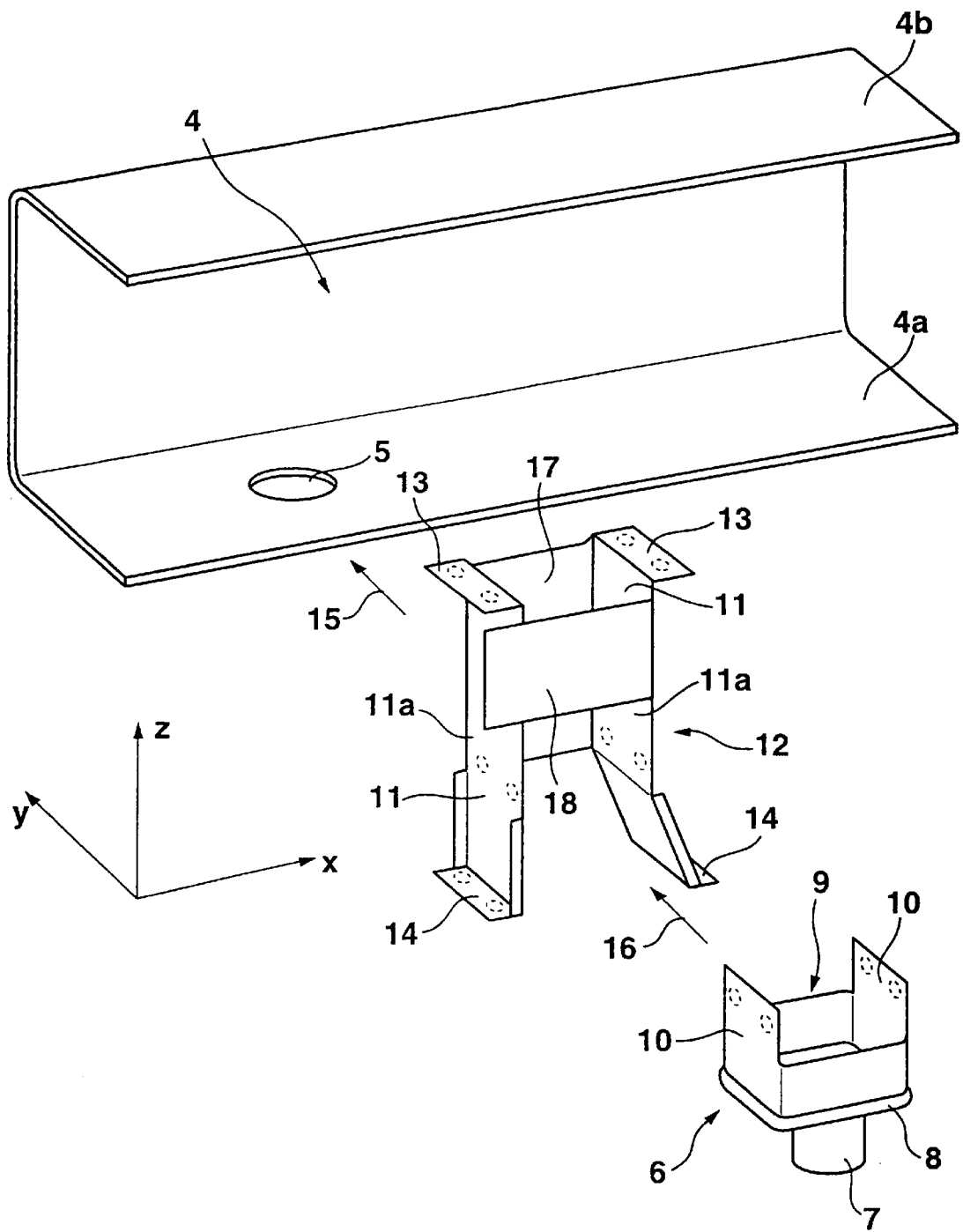
FIG. 3 is an exploded view of the parts associated with the body beam of FIG. 1 for the rigid fastening of the control arm.

FIG. 2 shows that the control arm 1, of which only a portion is shown, is to be fastened by means of a bolt 2 passing through the fastening eye 3 to the beam 4, of channel-shaped cross section, of the vehicle body which is not shown in detail. The beam 4 has in its bottom flange—which can be seen especially in FIG. 3—an opening 5 through which a threaded socket indicated as a whole at 6, permits access to the bolt 2 for the purpose of mounting the axle 1. This threaded socket consists, as can be seen in FIG. 3, of an internally threaded socket 7 which can be passed through the opening 5, and of a flange 8 affixed to this socket 7, which is held by a frame 9 of which two parallel and opposite lateral walls are prolonged upwardly. These lateral walls 10 are adjoined by corresponding walls 11, likewise aligned parallel to one another, of a cage 12 whose lateral walls 11 are provided at their upper ends with flanges 13 for contact with the upper flange 4b of the channel-shaped beam 4 and at their lower end are provided with flanges 14 which serve for joining to the bottom flange 4a of the beam 4. At their lower part the lateral walls 11 are bent slightly outward, so that only the central area 11a of the lateral walls 11 are in contact with the guiding walls 10 of the threaded socket 6 when the parts are assembled as in FIG. 1.

Assembly is performed in the following manner:

First the cage 12 is inserted between the flanges 4a and 4b of the beam 4, being guided by its flanges 13 and 14 on the inside of the top and bottom flanges. As FIG. 3 shows, the two side walls 11 are joined together by two cross walls 17, 18 to form a kind of shaft, wherein the front cross wall 18 does not reach as far down as the rear cross wall 17. The dimensions are made such that, with the cage 12 inserted, i.e., when the cage 12 is within the flanges 4a and 4b of the channel 4 and approximately in reach of the opening 5, then after it has been inserted in the direction of the arrow 15 the possibility exists for inserting the guiding walls 10 of the threaded socket 6 under this cross wall 18 to its end position.

When the cage 12 is within the beam 4, the threaded socket 6 is inserted from the open side of the beam 4 in the direction of the arrow 16, into the cage 12, and sufficient space under the cross wall 18 must be present for such insertion. At this moment the socket 7 is pushed on the inside surface of the lower flange 4a until it has reached the opening 5. Therefore, the threaded socket 6 is situated much higher upon insertion than it will be in its end position. The socket 7 is then put into the opening 5, so that the threaded socket is then still held loosely in the beam 4. As FIG. 2 shows, tolerance equalization in the direction of the arrows 19, i.e., lengthwise of the beam 4, is possible by 8 shifting the cage 12 in this direction. Tolerance equalization in the direction of the arrows 20, i.e., perpendicular to the length of the beam 4, is possible due to the possibility of shifting the guiding walls 10 of the threaded socket 6 with respect to the walls 11a of the cage 12. After the application of a gauge or jig by means of which the fastening points 30 and 30' on both beams can be aligned with one another, the flanges 13 and 14 of the cage 12 are spot-welded to the flanges 4b and 41 at points 38 and the guiding walls 10 are spot-welded to the walls 11a at points 39, so that an extremely stable fastening is achieved. Also, flange 8 of the socket 7 can, if desired, be spot-welded to the lower flange 4a.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fastening device comprising:

a motor vehicle body beam defining an opening;

a threaded socket comprising a stud defining an internal thread and a flange coupled to said stud, said stud being insertable through said opening, said flange to be supported on said beam when said stud is inserted through said opening, said internal thread being configured to receive a threaded connector for coupling a component to said beam; and a cage comprising at least one surface to be fixedly coupled to said beam and at least one surface to be fixedly coupled to said threaded socket.

2. Fastening device according to claim 1, wherein said beam is a channel comprising an upper flange and a lower flange parallel to said upper flange.

3. Fastening device according to claim 2, wherein said at least one surface to be fixedly coupled to said beam comprises at least one surface to be fixedly coupled to said upper flange and at least one surface to be fixedly coupled to said lower flange.

4. Fastening device according to claim 2, wherein said threaded socket further comprises at least two lateral guide walls aligned parallel to each other and coupled to said flange, said at least two lateral guide walls to be fixedly coupled to said cage at said at least one surface to be fixedly coupled to said threaded socket.

5. Fastening device according to claim 1, wherein said at least one surface of said cage to be fixedly coupled to said threaded socket comprises two lateral walls aligned parallel to each other and extending along a height of said beam, and wherein said at least one surface to be fixedly coupled to said beam comprising flanges extending perpendicularly from said lateral walls.

6. Fastening device according to claim 4, wherein said at least one surface of said cage to be fixedly coupled to said threaded socket comprises two lateral walls aligned parallel to each other and extending between said upper flange and said lower flange, and wherein said at least one surface to be fixedly coupled to said beam comprises an upper connection flange extending perpendicularly from each of said lateral walls to be engaged with said upper flange and a lower connection flange extending perpendicularly from each of said lateral walls to be engaged with said lower flange.

7. Fastening device according to claim 5, wherein said lateral walls are joined to one another by at least two cross walls.

8. Fastening device according to claim 6, wherein said lateral walls are joined to one another by at least two cross walls.

9. Fastening device according to claim 8, wherein one of said cross walls is to be located on an open side of the beam and is dimensioned such that the guide walls of the flange fit under said one of said cross walls when assembled.

10. Device according to claim 4, wherein the guide walls are joined to one another by lateral walls of a lateral wall frame encompassing the flange.

11. A method of assembling the fastening device of claim 2, comprising;

inserting said cage between the upper and lower flanges of said beam;

inserting said threaded socket into said cage;

fixedly coupling said cage to said beam; and fixedly coupling said threaded socket to said cage.

12. A method of assembling the fastening device of claim 6, comprising:

inserting said cage between the upper and lower flanges of said beam;

inserting said threaded socket into said cage;

fixedly coupling said upper connection flange to said upper flange of said beam;

fixedly coupling said lower connection flange to said lower flange of said beam; and fixedly coupling said lateral guide walls to said lateral walls of said cage.

* * * * *